R. C. WHITE.
FLYING MACHINE.
APPLICATION FILED JAN. 21, 1910.

1,008,761.

Patented Nov. 14, 1911.
3 SHEETS—SHEET 1.

Witnesses:
C. J. Williams
Florence Williams

Inventor,
Rufus Clayton White

Semer G. Wells,
Attorney.

R. C. WHITE.
FLYING MACHINE.
APPLICATION FILED JAN. 21, 1910.

1,008,761.

Patented Nov. 14, 1911.
3 SHEETS—SHEET 2.

Witnesses:
C. J. Williams
Florence Williams

Inventor,
Rufus Clayton White
Semer G. Wells,
Attorney.

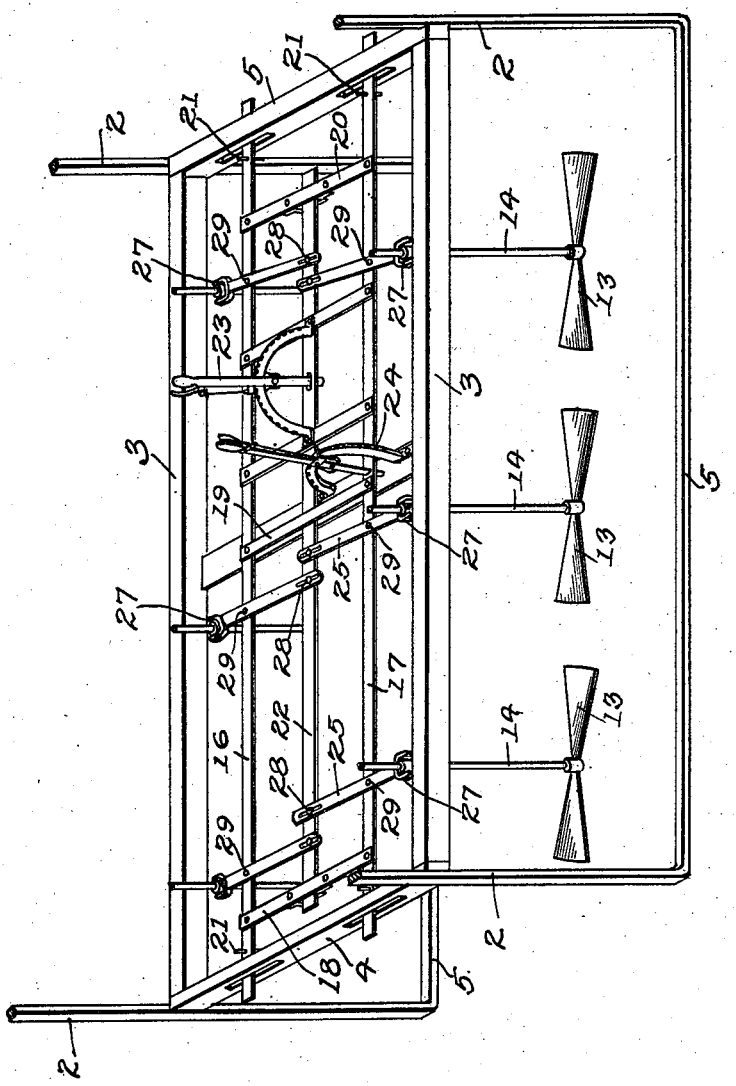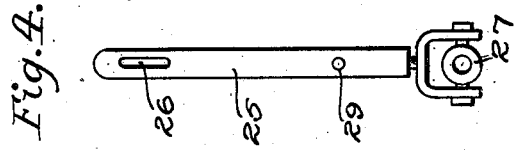

UNITED STATES PATENT OFFICE.

RUFUS CLAYTON WHITE, OF LOS ANGELES, CALIFORNIA.

FLYING-MACHINE.

1,008,761.　　　　　　　Specification of Letters Patent.　　Patented Nov. 14, 1911.

Application filed January 21, 1910. Serial No. 539,431.

*To all whom it may concern:*

Be it known that I, RUFUS CLAYTON WHITE, a citizen of the United States, and a resident of Los Angeles, California, have invented a new and useful Flying-Machine, of which the following is a specification.

My object is to produce a flying machine having swiveled propellers for lifting, guiding and driving, either with or without the aid of a gas bag, and my invention consists of the novel features herein shown, described and claimed.

Figure 1:
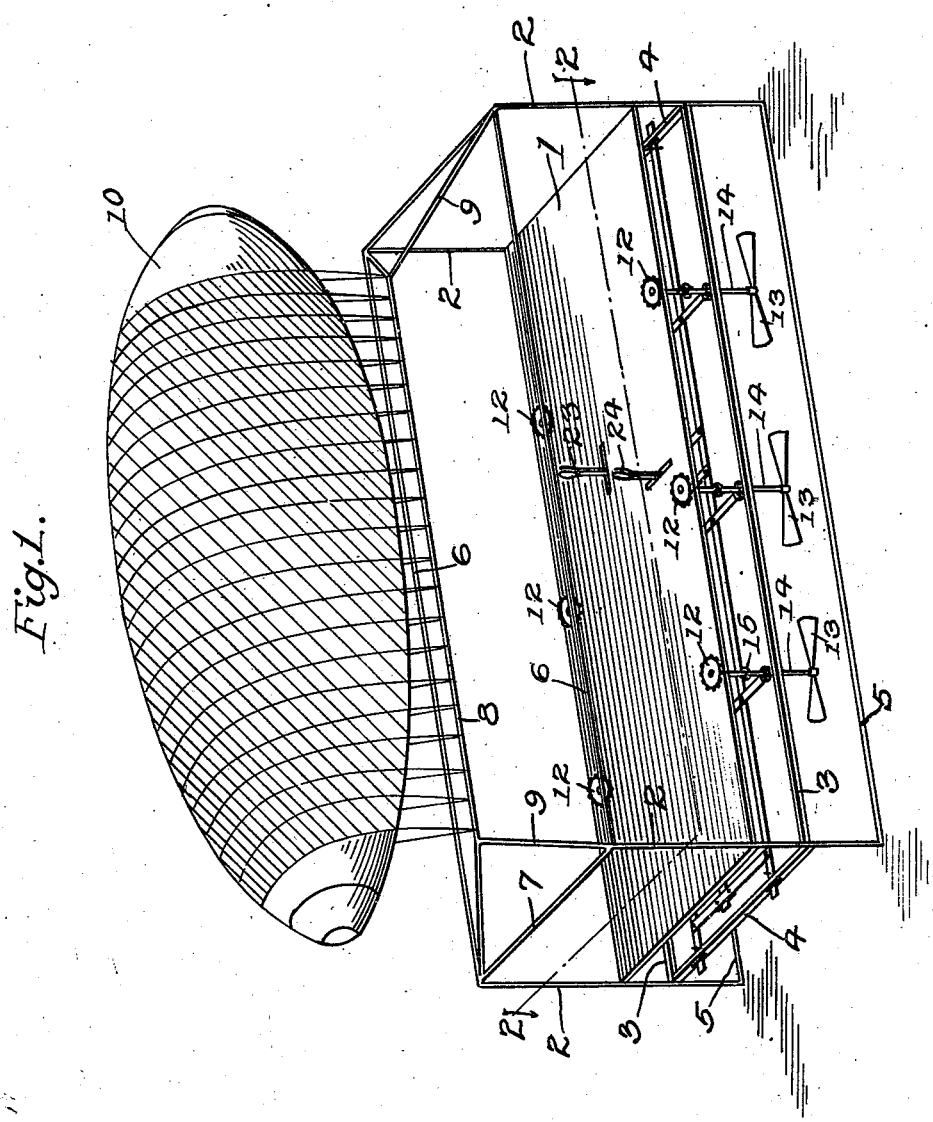
Figure 2:
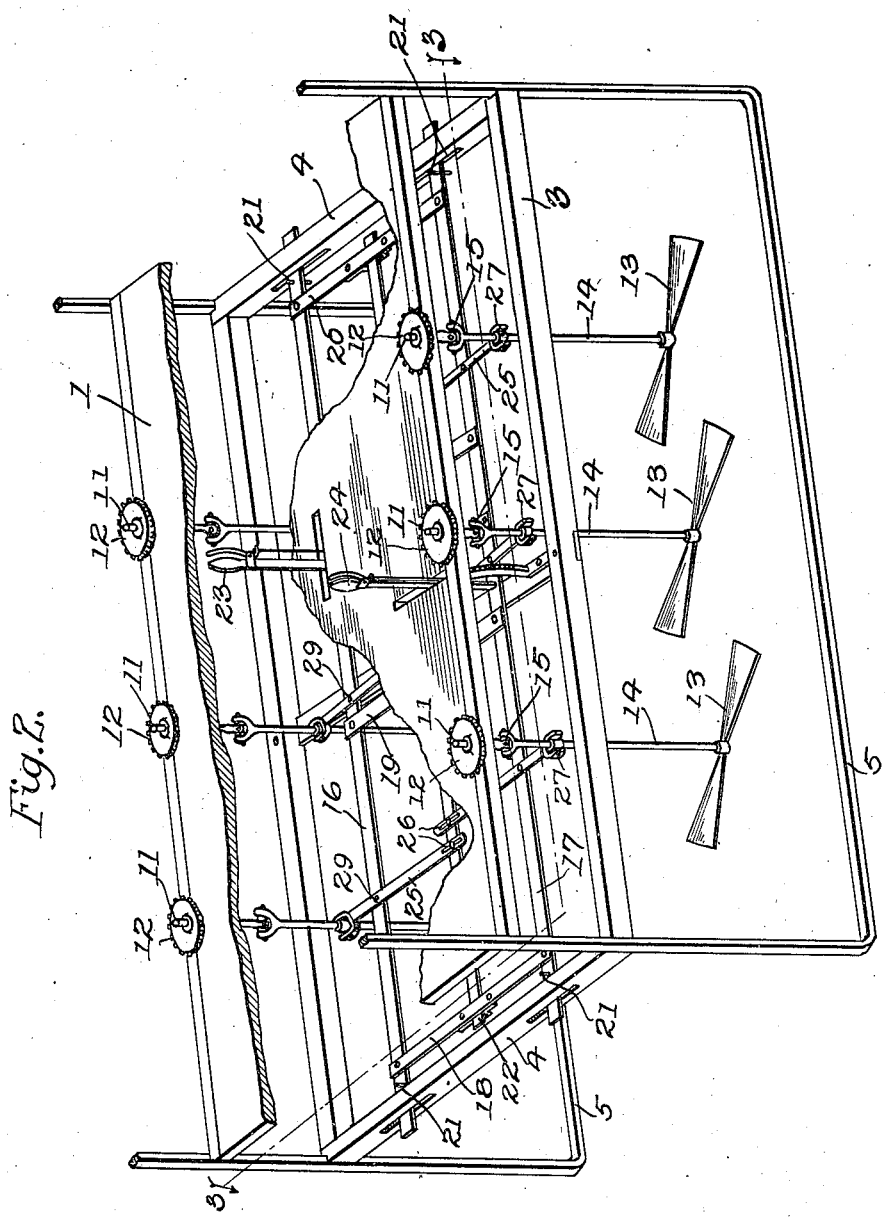

In the drawings: Figure 1 is a perspective view of a flying machine embodying the principles of my invention. Fig. 2 is an enlarged detailed perspective of the controlling mechanism, the gas bag and upper parts of the frame being omitted or broken away, to show the parts below the line 2—2 in Fig. 1. Fig. 3 is a view analogous to Fig. 2, the upper deck being omitted to show the controlling mechanism, below the line 3—3 in Fig. 2.

Referring to the drawings in detail, I have omitted the power and transmission mechanism. The upper deck or platform 1 is supported at each of its four corners by posts 2, said posts extending upwardly and downwardly. Side sills 3 and ends sills 4 are secured to the posts 2 below the upper deck 1 and form a frame work upon which is mounted the controlling mechanism. Braces 5 parallel with the sills 3 connect the lower ends of the posts 2. Side braces 6 connect the upper ends of the posts 2. The ridge pole 8 is mounted parallel with the side braces 6 and is connected to the upper ends of the posts 2 by braces 9. The gas bag 10 is connected to the ridge pole 8. The sills 3 and 4 form an open lower deck upon which the controlling mechanism is mounted. The driving shafts 11 are mounted vertically through the upper deck 1 and preferably in rows near the sides of the deck. I have shown three driving shafts on each side but the number may be varied to suit the demand. Driving gears 12 are fixed upon the driving shafts 11 and may be driven in any suitable manner. The propeller wheels 13 are mounted upon shafts 14, said shafts 14 being connected to the driving shafts 11 by universal joints 15, so that the propellers are swiveled to swing in any direction out of alinement with the driving shafts 11. A sliding frame forms a part of the lower deck, said sliding frame comprising the side bars 16 and 17, located substantially parallel with the sills 3 and extending through the sills 4, and cross bars 18, 19 and 20 rigidly connecting the side bars 16 and 17 together. The sills 4 have slotted bearings so as to allow the sliding frame to move transversely of the machine, and stops 21 are inserted through the ends of the side bars 16 and 17 to limit the endwise motion of the sliding frame. A link bar 22 is mounted half way between the bars 16 and 17 and slides endwise in bearings carried by the cross bars 18 and 20. A hand lever and pawl and rack 23 is mounted upon the sliding frame, so that the lower end of the lever connects to the link bar 22 for sliding the link bar endwise and the handle end of the lever projects upwardly, through the upper deck 1, and a hand lever and pawl and rack 24 is mounted upon the rigid frame of the lower deck, the lower end of the lever connecting to the sliding frame, so as to move the frame transversely of the machine, and the upper end of the hand lever extending upwardly through the upper deck 1. Levers 25 are pivotally mounted upon the side bars 16 and 17, the inner ends of the levers having slots 26 and the outer ends of the levers having sleeves 27. Pins 28 are inserted through the slots 26 and fixed in the link bar 22, and the propeller shafts 14 are inserted through the sleeves 27, and pivots 29 connect the levers 25 to the side bars 16 and 17, so that by manipulating the hand levers 23 and 24 the propeller wheels may be swung in any desired direction to lift, guide, and drive the machine.

The details of construction may be varied in many ways without departing from the spirit of my invention. The gas bag may be of any desired size or it may be omitted. Any suitable form of engine and transmission may be used and any desired number or style of propellers may be used.

I claim:

1. In a flying machine, a main frame; propeller-shafts mounted vertically in the main frame; propellers upon the lower ends of the propeller-shafts, there being universal joints in the propeller-shafts so as to allow the propellers to swing; a sliding frame in the lower part of the main frame and connected to the propeller-shafts, for swinging the propellers in one direction; a slide for swinging the propeller-shafts in another direction; and hand levers for operating the sliding-frame and slide.

2. In a flying machine, a main frame; propeller-shafts mounted vertically in the main frame; propellers upon the lower ends of the propeller-shafts, there being universal joints in the propeller-shafts so as to allow the propellers to swing; a sliding frame in the lower part of the main frame and connected to the propeller-shafts, for swinging the propellers in one direction; a slide for swinging the propeller-shafts in another direction; hand levers for operating the sliding-frame and slide; and a gas bag connected to the main frame.

RUFUS CLAYTON WHITE.

Witnesses:
D. L. OLMSTEAD,
S. S. MCKENNEY.